Feb. 3, 1959  J. R. EDMUND  2,871,876
RATE SENSITIVE BROKEN PIPE PROTECTION VALVE APPARATUS
Filed March 8, 1956
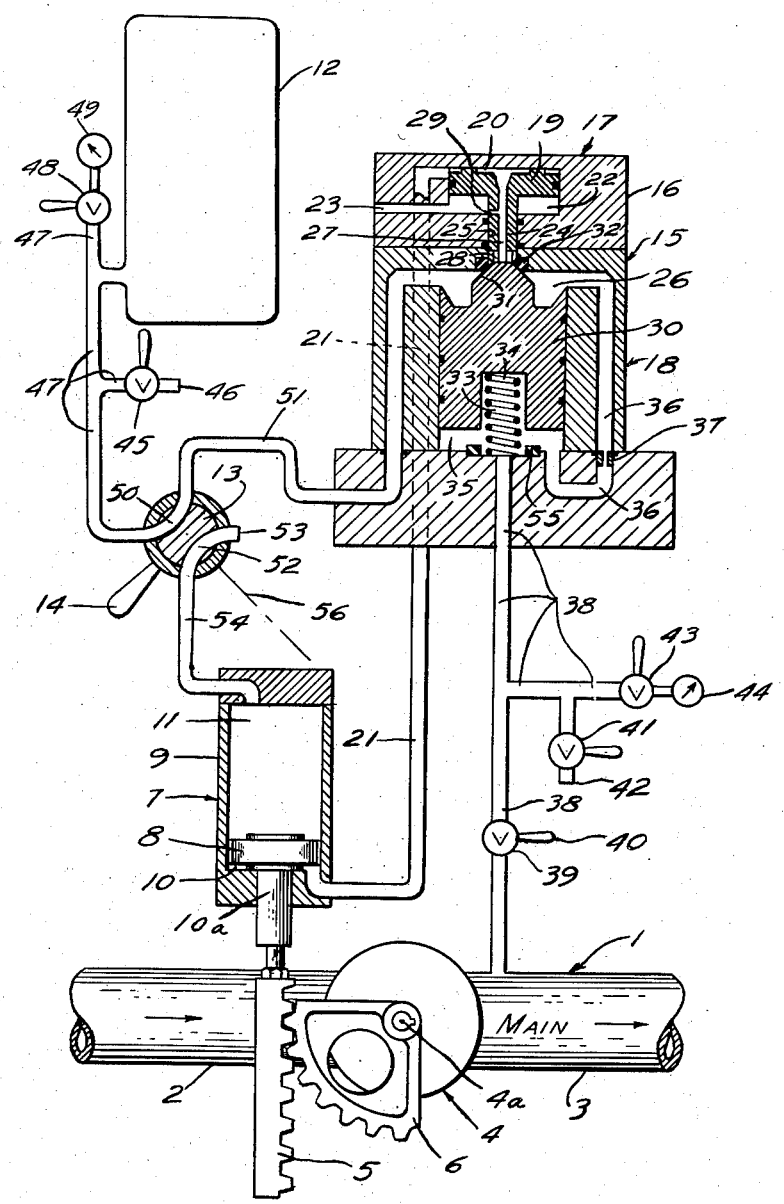
INVENTOR.
John R. Edmund
BY
Aulbert A. Steinmiller
ATTORNEY United States Patent Office 2,871,876
Patented Feb. 3, 1959

2,871,876

RATE SENSITIVE BROKEN PIPE PROTECTION VALVE APPARATUS

John R. Edmund, Berkeley, Calif., assignor to Westinghouse Air Brake Company, Wilmerding, Pa., a corporation of Pennsylvania Application March 8, 1956, Serial No. 570,305

9 Claims. (Cl. 137—464)

This invention relates to rate sensitive apparatus for effecting an automatic shut-off of fluid flow through a fluid distribution system in event of rupture of a main or a sudden excessive leakage condition in said main.

In distribution systems for transmission of natural gas through large pipe lines at pressures of 600 to 1000 p. s. i., it is customary to provide a shut-off valve that is actuated by a large piston (up to 24 inches in diameter) subject opposingly to pressures in the main at the downstream side of the shut-off valve and to pressure in a large reservoir having restricted communication with the main. With this arrangement, if the rate of drop in pressure in the main exceeds 15 p. s. i. per minute, a fluid pressure differential will be created which must become great enough to actuate the piston by the time the pressure has dropped 50 percent.

One object of this invention is to provide an improved rate sensitive apparatus of the above general type embodying pilot valve means operable upon a relatively small percentage drop in pressure in the main to effect operation of a fluid pressure motor for thereby effecting closure of the shut-off valve more promptly and more reliably than heretofore possible.

Another object is to provide an improved rate sensitive apparatus which will operate automatically to shut off flow through a main when pressure in the main drops at more than a preselected rate due to leakage from, or rupture of, the main either upstream or downstream of the shut-off valve, and which apparatus will, until manually reset, maintain such flow shut off even if pressure in the main is subsequently restored.

Another object is to provide an improved rate sensitive apparatus which is lower in cost than arrangements previously proposed, because it conserves reservoir pressure and eliminates the need for the large piston (to get the necessary differential force to assure movement by reservoir pressure against opposing pressure in the main) and the large reservoir (to provide the fluid pressure necessary to actuate said piston).

Other objects and advantages will become apparent from the following more detailed description of the invention and from the accompanying drawing, in which the single figure is a diagrammatic view of a rate sensitive apparatus embodying the invention and shown associated with a pipe line or main.

Description

As shown in the drawing, the improved rate sensitive apparatus is associated with a pipe line or main 1 having an upstream portion 2 and a downstream portion 3, between which portions is interposed a shut-off valve 4. This valve 4 may, for sake of illustration, be of the rotary plug type, adapted to be actuated by reciprocation of a gear rack 5 that effects rotation of valve 4 through the medium of a quadrant gear segment 6 pivotally secured to the stem 4a of said valve. Reciprocation of the gear rack 5 is controlled by a fluid pressure motor 7.

The motor 7 comprises a piston 8 that is slidably mounted in a sectionalized casing 9 and subject opposingly to fluid pressures in chambers 10, 11. Coaxially connected to the piston 8 is a piston rod 10a that projects through chamber 10 and one end of the casing and is coaxially connected at its projecting end to the gear rack 5.

According to the invention, the rate sensitive apparatus embodying the invention comprises a reservoir 12 for storing fluid under pressure; a valve 13, preferably of the rotary plug type manually operable by a handle 14 to a normal position, in which it is shown; and a pilot valve device 15 that is contained within a sectionalized casing 16 and preferably comprises a selector valve device 17 for controlling operation of the motor 7 and also comprises a rate sensitive valve device 18 for controlling operation of the device 17.

The selector valve device 17 may comprise a piston 19 slidably mounted in a bore in the casing 16 and subject at one side to pressure of fluid in a chamber 20 that is constantly open by way of a passage and pipe 21 to chamber 10 of motor 7. The piston 19 is subject at the opposite side to fluid pressure in a chamber 22 constantly open to atmosphere via a vent port 23. The piston 19 has a coaxially-arranged stem 24 that has sealing, slidably guided contact with the wall of an aligned bore 25 through a casing partition separating atmospheric chamber 22 from a chamber 26. Extending axially through the piston 19 and stem 24 is a passageway 27 which, at its end adjacent chamber 26, communicates with a fluted part 28 of said stem. When the piston 19 is in a normal position, in which it is shown, an annular rib preferably formed integrally with the end of piston 19 concentrically with the passageway 27 engages the end wall of chamber 20; and the chamber 10 of motor 7 has restricted connection with the atmosphere past said rib and via the passageway 27 and a restricted radial port 29 then connecting said passageway to atmospheric chamber 22.

The rate sensitive valve device 18 may comprise a piston valve 30 that is arranged coaxially with the piston 19 and is slidably mounted in a bore in the casing 16. Projecting outwardly from one end of the piston valve 30 is a truncated tapered valve 31 that is adapted to sealingly engage an annular resilient valve seat 32 mounted in the end wall of chamber 26 in encirclement of the bore 25, for thereby preventing fluid flow from the chamber 26 to the passageway 27. Extending coaxially inward from the opposite end of piston valve 30 is a recess 33, in which is preferably accommodated a helical bias spring 34 for biasing the piston valve 30 to a normal position, in which it is shown. With piston valve 30 in this position, the tapered valve 31 seals against the seat 32; valve 31, through abutting engagement with the fluted part 28 of stem 24, biases the piston 19 to its previously-defined normal position; and the recess 33 is opened past the end of piston valve 30 to an annular chamber 35 having restricted communication with chamber 26 by way of a passage 36 containing a choke 37. The recess 33 is constantly open to a casing passage and pipe 38, which pipe is normally opened to the downstream portion 3 of the main 1 by way of a normally open valve 39 that is preferably of the rotary plug type, manually operable by a handle 40.

The rate sensitive apparatus may also comprise a normally closed valve 41 operable to open a branch of pipe 38 to a vent pipe 42; a normally closed valve 43 operable to connect a branch of pipe 38 with a pressure gauge 44; a normally closed valve 45 operable to open a vent pipe 46 to a branch of a pipe 47 leading from the reservoir 12 to the valve 13; and a normally closed valve 48 operable to connect a branch of pipe 47 to a pressure gauge 49.

These valves 41, 43, 45, 48 may be of any suitable manually operable type, and will be assumed to be in their respective positions, as just defined, throughout subsequent description of operation.

*Operation*

Assume that the handle 14 of valve 13 is in its normal position, in which it is shown, and in which a passage 50 in said valve connects the reservoir pipe 47 with a pipe and passage 51 leading to chamber 26, and in which another passage 52 in said valve connects an atmospheric vent pipe 53 with a pipe 54 leading to chamber 11 of the motor 7. Assume further that the piston 8 of motor 7 is in a normal position, in which it is shown, defined by contact of the piston with the end wall of chamber 10; in this position, gear rack 5 and hence the segment gear 6 is so positioned as to open the valve 4 for permitting substantially unrestricted flow of fluid from the upstream portion 2 to the downstream portion 3 of the main 1. Assuming also that valve 39 is closed and that the reservoir 12 is devoid of fluid under pressure, piston 30 will be biased by spring 34 to its normal position, in which it is shown. Under these assumed conditions, the various components will assume the respective positions in which they are shown in the drawing.

To initially condition the apparatus, handle 40 is operated to open valve 39 for thereby permitting fluid under pressure to flow from the downstream portion 3 via pipe and passage 38 to recess 33 and chamber 35, whence it will flow at the restricted rate controlled by choke 37 through passage 36, chamber 26, pipe 51, and passage 50 of valve 13 in normal position, to pipe 47 for charging the reservoir 12.

With piston valve 30 in normal position, the tapered valve 31 will seal against the valve seat 32 and abut and thereby hold the piston 19 of selector valve device 17 in its normal position, in which it is shown, and in which position the chamber 10 of motor 7 is maintained vented to atmosphere via pipe and passage 21, chamber 20, passageway 27, restricted port 29 and atmospheric chamber 22, as previously described. Thus, with piston valve 30 in normal position, pressure of fluid in chamber 26 will be effective only on that area of the piston valve surrounding the valve seat 32 because the portion of valve 31 within the valve seat is then exposed to atmospheric pressure. For this reason, the bias spring 34 may be eliminated, if desired.

Fluid under pressure will continue to flow to the reservoir 12 via communication just described, including choke 37, until pressure in the reservoir is equal to that in the main 1; whereupon flow through choke 37 will cease and fluid pressures across the piston valve 30 will be equal. The apparatus is now in condition for operation.

Assume now that pressure in the main 1 drops at a rate exceeding the selected flow capacity of choke 37, such as due to a break in the main either upstream or downstream of the valve 4. Under this condition, pressure in recess 33 and chamber 35 will reduce uniformly with pressure in the main, whereas reservoir pressure, as noted in chamber 26, cannot reduce as rapidly as pressure in the main, due to the restricted backflow through choke 37. Consequently, the piston valve 30 will be shifted promptly, by preponderant fluid pressure in chamber 26, from its normal position to a cut-off position, in which the valve 31 is disengaged from seat 32 and the end of piston valve 30 surrounding the recess 33 sealingly seats against an annular resilient valve seat 55 suitably mounted in the end wall of chamber 35 in encirclement of passage 38, for thereby promptly cutting off fluid pressure communication between recess 33 and annular chamber 35 and hence between the main and the reservoir 12. It is to be noted that as soon as valve 31 becomes disengaged from its seat 32, the effective area of the piston valve 30 exposed to reservoir pressure will be suddenly increased by the area of that portion of valve 31 which had theretofore been contained within the annular seat 32 and had been exposed to atmospheric pressure; and this sudden increase in the area of piston valve 30 exposed to reservoir pressure will tend to cause piston valve 30 to promptly snap to its cut-off position. Meanwhile, as soon as valve 31 becomes disengaged from its seat 32, fluid under pressure will flow from reservoir 12 and chamber 26 via passageway 27 to chamber 20. Pressure fluid thus supplied to chamber 20 will impose a downward force on piston 19 which will be transmitted to piston valve 30 via stem 24 for assisting in the movement of piston valve 30 to its cut-off position, if it is not already there by virtue of the above-described snap action. As piston 19 is moved downwardly, by pressure fluid in chamber 20, to a supply position, defined by contact of the fluted part 28 of stem 24 with the valve 31 when piston valve 30 is in cut-off position, the restricted port 29 will be cut off from atmospheric chamber 22, permitting reservoir fluid to flow (without depletion through port 29) via chamber 20 through passage and pipe 21 to chamber 10 of the motor 7. Pressure of fluid thus supplied to chamber 10 from the reservoir 12 will shift the piston 8 upwardly, against atmospheric pressure in chamber 11, to a shut-off position defined by contact of said piston with the end wall of chamber 11. As piston 8 and hence piston rod 10a move upwardly, the gear rack 5 will be pulled upwardly a corresponding degree for thereby pivoting the segment gear 6 clockwise and thereby rotating the stem 4a of valve 4 sufficiently to effect closure of valve 4. With valve 4 closed, fluid flow between the upstream and downstream portions 2, 3 of the main 1 will be prevented. Although there will be some flow of fluid under pressure from the reservoir 12 to the motor chamber 10 as soon as valve 31 is disengaged from its seat 32, it is intended that the piston valve 30 be actuated to its cut-off position (by virtue of the snap-action and, if needed, the assistance of piston 19) to seal off pipe 38 from chamber 26 before sufficient pressure is developed in motor chamber 10 to cause motor 7 to operate to close valve 4 against the inherent resistance of the operating mechanism (including piston rod 10a, rack 5, segment gear 6, and stem 4a) interposed between the piston 8 and valve 4.

After closure of the valve 4, whether due to a rupture in the upstream or downstream portions 2, 3 of the main, the piston valve 30 will remain in its cut-off position because reservoir fluid in chamber 26 will act over the full effective area of said piston valve and pressure in chamber 20 acting on the piston 19 of selected valve device 17 will exert an added bias on the piston valve through abutting contact of the stem 24 with the valve 31.

To recondition the apparatus after closure of the valve 4 and following repair of the main, the handle 40 is moved to close valve 39 to disconnect pipe 38 from the main 1. The handle 14 of valve 13 is then moved to a reconditioning position, denoted by the broken line 56. With valve 13 in this position, valve passage 50 connects pipes 47, 54 for supplying fluid under pressure from the reservoir 12 to the chamber 11 of motor 7; and valve passage 52 connects pipe 51 to vent pipe 53 for venting chamber 10 of said motor via pipe and passage 21, chamber 20 and passageway 27 of selector valve device 17, chamber 26 and pipe 51. As chamber 11 of motor 7 is thus charged and chamber 10 is vented, the piston 8 will shift downwardly and through the medium of the piston rod 10a correspondingly move the gear rack 5, which in turn will pivot the segment gear 6 counterclockwise for reopening the valve 4. Since valve 39 is closed, fluid under pressure cannot be vented from the main by flow past the end of piston valve 30 and through choke 37 to chamber 26, which chamber is then opened to atmosphere via valve 13 in its reconditioning position.

If, for any reason, such as when the bias spring 34 is used, the piston valve 30 should shift to normal position and, through contact of valve 31 with stem 24 shift the selector piston 19 to its normal position before chamber 10 of motor 7 is completely vented, pressure in chamber 10 will nevertheless blow down to atmosphere past the ribs of piston 19 and via chamber 20, passageway 27, restricted vent port 29 and atmospheric chamber 22.

After chamber 10 of motor 7 has been vented, handle 40 is operated to open valve 39 for supplying fluid under pressure from the main to pipe 38 for shifting the piston valve 30 to its normal position, in which it is shown, if it is not already there. Promptly after opening of the valve 39, the handle 14 of valve 13 is moved to its normal position, in which it is shown, for venting fluid under pressure from chamber 11 of motor 7 via valve passage 52 and vent pipe 53, while at the same time reconnecting reservoir 12 to chamber 26 via valve passage 50.

With piston valve 30 in its normal position, the reservoir 12 will be recharged to substantially the pressure in the main via communication previously described, including choke 37. The apparatus will then be conditioned to effect automatic closure of the valve 4, in the manner previously described, in the event of a subsequent sudden reduction in pressure in the main.

According to a feature of the invention, the motor piston 8 is normally subject to atmospheric pressure in opposing chambers 10, 11 and operable to one or the other of two positions for effecting closure or opening of the shut-off valve 4, respectively, according to which of said chambers is selectively charged with fluid under pressure. With this arrangement, the reservoir 12 may be of considerably smaller volume than that required in arrangements heretofore proposed, wherein the motor piston is subject opposingly to reservoir pressure and to pressure in the main.

According to another feature of the invention, pressure in the reservoir 12 is conserved because the reservoir is not vented to atmosphere, such as necessary in arrangements heretofore proposed, to assure operation of the motor to reopen the shut-off valve.

According to another feature of the invention, the piston valve 30 responds to an excessive rate of reduction in pressure in the main to promptly cut off the reservoir 12 from the main and concurrently unseat valve 31 for causing prompt operation of the selector piston 19 to cut off the motor chamber 10 from the restricted atmospheric vent port 29 and permit supply of fluid under pressure to the motor chamber 10 without depletion for effecting closure of the shut-off valve 4.

The choke 37 is of such selected flow capacity, in relation to the opposing effective areas of the piston valve 30 and bias force of spring 34 (if used), that the piston valve 30 will shift to its cut-off position whenever pressure in the main drops below that in the reservoir 12 at a rate exceeding a preselected rate. The bias spring 34, if used, will help to prevent undesirable operation of the piston valve 30 to cut-off position during normal fluctuations in pressure in the main due to pressure surges therein, as well as positively bias said piston valve to its normal position.

*Summary*

It will now be seen that the improved rate sensitive apparatus embodies a pilot valve device 15 comprising a rate sensitive valve device 18 and a selector valve device 17. The device 18 comprises a piston valve 30 which is biased to a normal position for supplying fluid under pressure from the downstream portion 3 of the main to a reservoir 12 via a choke 37 and valve 13 and also operatively holding the piston 19 of device 17 in a normal position for maintaining a chamber 10 of a fluid pressure motor 7 vented. Upon a drop in pressure in main at a rate in excess of the flow rate through choke 37, the piston valve 30 will be snap-operated to a cut-off position for disconnecting the main from the reservoir and admitting reservoir fluid to chamber 20 of the selector valve device 17, for thereby causing the piston 19 to operate to successively cut off chamber 10 from atmosphere and then supply reservoir fluid (without depletion via restricted port 29) to the latter chamber. The motor 7 comprises a piston 8 which is subject opposingly to fluid pressures in chamber 10 and in a chamber 11 that is normally vented via valve 13. When fluid under pressure is supplied to chamber 10, the piston 8 shifts, thereby advancing a gear rack 5 for pivoting a segment gear 6 and thereby rotating a shut-off valve 4 to a closed position for shutting off flow through the main.

The improved apparatus will thus operate to automatically close the shut-off valve 4 if pressure in the main is reduced at an excessive rate either upstream or downstream of the valve 4. Valve 4 will be maintained closed until the apparatus is reconditioned by certain manual operations.

Since the fluid pressure motor 7 is normally subject to opposing atmospheric pressures in the chambers 10, 11 and actuated to close or open the shut-off valve 4 according to which of these chambers is selectively charged, the size of the motor piston 8 and of the reservoir 12 may be considerably smaller than the motor piston and reservoir of arrangements heretofore proposed. Also reservoir fluid is conserved because fluid in the reservoir is not completely vented to atmosphere during reconditioning of the apparatus.

Also, the piston valve means 30 is controlled by opposing fluid pressures in the reservoir 12 and in the portion of the main downstream of the shut-off valve 4 and responds to a reduction in pressure in the main at a rate exceeding the flow rate through choke 37 to disconnect the reservoir from the main prior to operation of the motor 7 to effect closure of the shut-off valve 4, thereby preventing backflow of pressure fluid from the reservoir into the main via choke 37.

Having now described the invention, what I claim as new and desire to secure by Letters Patent, is:

1. A rate sensitive apparatus for shutting off fluid flow through a main, said apparatus comprising, in combination, normally open shut-off valve means interposed in the main and operable to a closed position for preventing fluid flow therethrough, power means for controlling operation of said shut-off valve means, a reservoir for storing fluid under pressure, means defining a normally open restricted flow connection between said reservoir and the portion of the main downstream of said shut-off valve means, means operable by reservoir pressure responsively to a reduction in pressure in the main at a rate exceeding the flow rate through said restricted flow connection to disconnect the main from said reservoir and cause operation of said power means to effect closure of said shut-off valve means.

2. A rate sensitive apparatus for shutting off fluid flow through a main, said apparatus comprising, in combination, normally open shut-off valve means interposed in the main and operable to a closed position for preventing fluid flow therethrough, fluid pressure motor means subject to opposing fluid pressures in a first chamber and a normally vented second chamber and responsive to charging of said first chamber to cause closure of said shut-off valve means, a reservoir for storing fluid under pressure, means defining a normally opened restricted flow connection between said reservoir and the portion of the main downstream of said shut-off valve means, selector valve means normally connecting said first chamber to atmosphere, and rate sensitive valve means operable by reservoir pressure responsively to a reduction in pressure in the main at a rate exceeding the flow rate through the restricted flow connection to open the reservoir to said first chamber and close the restricted flow connection to conserve reservoir pressure by closing off the reservoir from the main and cause operation of said selector means to cut off said first chamber from atmosphere.

3. A rate sensitive apparatus for shutting off fluid flow through a main, said apparatus comprising, in combination, normally open shut-off valve means interposed in the main and operable to a closed position for preventing fluid flow therethrough, fluid pressure motor means subject to opposing fluid pressures in a first chamber and a normally vented second chamber and responsive to charging of said first chamber to cause closure of said shut-off valve means, a reservoir for storing fluid under pressure, means defining a normally opened restricted flow connection between said reservoir and the portion of the main downstream of said shut-off valve means, pilot valve means subject to fluid pressure in the portion of the main downstream of said shut-off valve means acting in opposition to reservoir pressure and pressure of fluid in said first chamber, said pilot valve means normally being biased to one position for opening said restricted flow connection while also maintaining said first chamber vented to atmosphere, said pilot valve means being operative to another position responsively to a reduction in pressure in the main at a rate exceeding the flow rate through the restricted flow connection for closing the latter so as to thereby close off the reservoir from the main to conserve reservoir pressure and for also cutting off said first chamber from atmosphere and supplying fluid under pressure to said first chamber from said reservoir.

4. A rate sensitive apparatus for shutting off fluid flow through a main, said apparatus comprising, in combination, normally open shut-off valve means interposed in the main and operable to a closed position for preventing fluid flow therethrough, fluid pressure motor means subject to opposing fluid pressures in a first chamber and a normally vented second chamber and responsive to charging of said first chamber to cause closure of said shut-off valve means, a reservoir for storing fluid under pressure, means defining a normally opened restricted flow connection between said reservoir and the portion of the main downstream of said shut-off valve means, pilot valve means subject to fluid pressure in the portion of the main downstream of said shut-off valve means acting in opposition to pressure of fluid in a third chamber open to said first chamber and to pressure of fluid in a fourth chamber normally open to said reservoir, said pilot valve means normally being in one position for opening said restricted flow connection and opening said first and third chambers to atmosphere, said pilot valve means being operable by pressure of fluid in said fourth chamber responsively to a reduction in pressure in the main at a rate exceeding the flow rate through the restricted flow connection to move to another position for closing said restricted flow connection so as to thereby cut off the reservoir from the main to conserve reservoir pressure and for also closing off said first and third chambers from atmosphere and supplying fluid under pressure from said reservoir via said fourth chamber to said first and third chambers, for thereby causing operation of said motor means to effect closure of said shut-off valve means and also causing fluid pressure in said third chamber to impose a bias on said pilot valve means tending to maintain it in its said other position.

5. The combination according to claim 4, including other valve means normally conditioned for connecting said second chamber to atmosphere and connecting said fourth chamber to said reservoir and conditionable to successively disestablish these connections and then connect said reservoir to said first chamber and connect said fourth chamber to atmosphere for causing operation of said motor means to effect reopening of said shut-off valve means and also causing return operation of said pilot valve mean to its said one position.

6. A rate sensitive apparatus for shutting off fluid flow through a main, said apparatus comprising, in combination, normally open shut-off valve means interposed in the main and operable to a closed position for preventing fluid flow therethrough, motor means controlled by opposing fluid pressures in a first chamber and a normally vented second chamber and responsive to charging of said first chamber to cause closure of said shut-off valve means, a reservoir for storing fluid under pressure, means defining a normally opened restricted flow connection between the said reservoir and the portion of the main downstream of said shut-off valve means, piston valve means having two oppositely seating valves, bias means normally urging said piston valve means to one position for opening one of said valves to thereby open said restricted flow connection while also closing the other of said valves, piston-operated selector means having a central passageway therethrough and a piston provided with an annular rib spaced concentrically about said passageway, said piston being subject at one side to pressure of fluid in a third chamber that is open to said passageway and also to said first chamber past said ribs and subject at the opposite side to atmospheric pressure, said selector means being operatively biased by said piston valve means while in its said one position to establish a restricted communication between said first and third chambers and atmosphere, said piston valve means being operable by reservoir pressure to another position responsively to a reduction in pressure in the main at a rate exceeding the flow rate through said restricted flow connection for closing said one valve to thereby close said restricted flow connection while also opening said other valve to thereby permit reservoir fluid to flow via said passageway to said third chamber, said selector means being responsive to development of a relatively small fluid pressure in said third chamber to close said restricted communication and permit supply of reservoir fluid to said first chamber via said third chamber without depletion via said restricted communication.

7. The combination according to claim 6, wherein said selector means responds to pressure of fluid in said third chamber to also operatively impose on said piston valve means a bias of a magnitude corresponding to the effect of fluid pressure in said third chamber on the piston of said piston-operated selector means for tending to maintain said piston valve means in its said other position.

8. The combination according to claim 6, including valve means normally conditioned to connect said second chamber to atmosphere and operable under another condition to disconnect said second chamber from atmosphere and supply fluid under pressure to said second chamber from said reservoir while also venting fluid under pressure from said first and third chambers for thereby causing operation of said motor means to effect reopening of said shut-off valve means and also causing return operation of said piston valve means to its said one position.

9. A rate sensitive apparatus for shutting off fluid flow through a main, said apparatus comprising, in combination, normally open shut-off valve means interposed in the main and operable to a closed position for preventing fluid flow therethrough, power means for controlling operation of said shut-off valve means, a reservoir for storing fluid under pressure, means defining a normally open restricted flow connection between said reservoir and the portion of the main downstream of said shut-off valve means, means operable by reservoir pressure responsively to a reduction in pressure in the main at a rate exceeding the flow rate through said restricted flow connection to close said restricted flow connection, for thereby disconnecting the main from said reservoir to conserve reservoir pressure, and also cause operation of said power means to effect closure of said shut-off valve means.

References Cited in the file of this patent

UNITED STATES PATENTS

| Number | Name | Date |
| --- | --- | --- |
| 2,081,542 | Kidney | May 25, 1937 |
| 2,302,370 | Hedene | Nov. 17, 1942 |
| 2,381,447 | Hedene | Aug. 7, 1947 |
| 2,426,212 | Hedene | Aug. 26, 1947 |
| 2,707,483 | Shafer | May 3, 1955 |